(No Model.)
J. D. MORAN.
FAUCET BUNG.
No. 346,558. Patented Aug. 3, 1886.
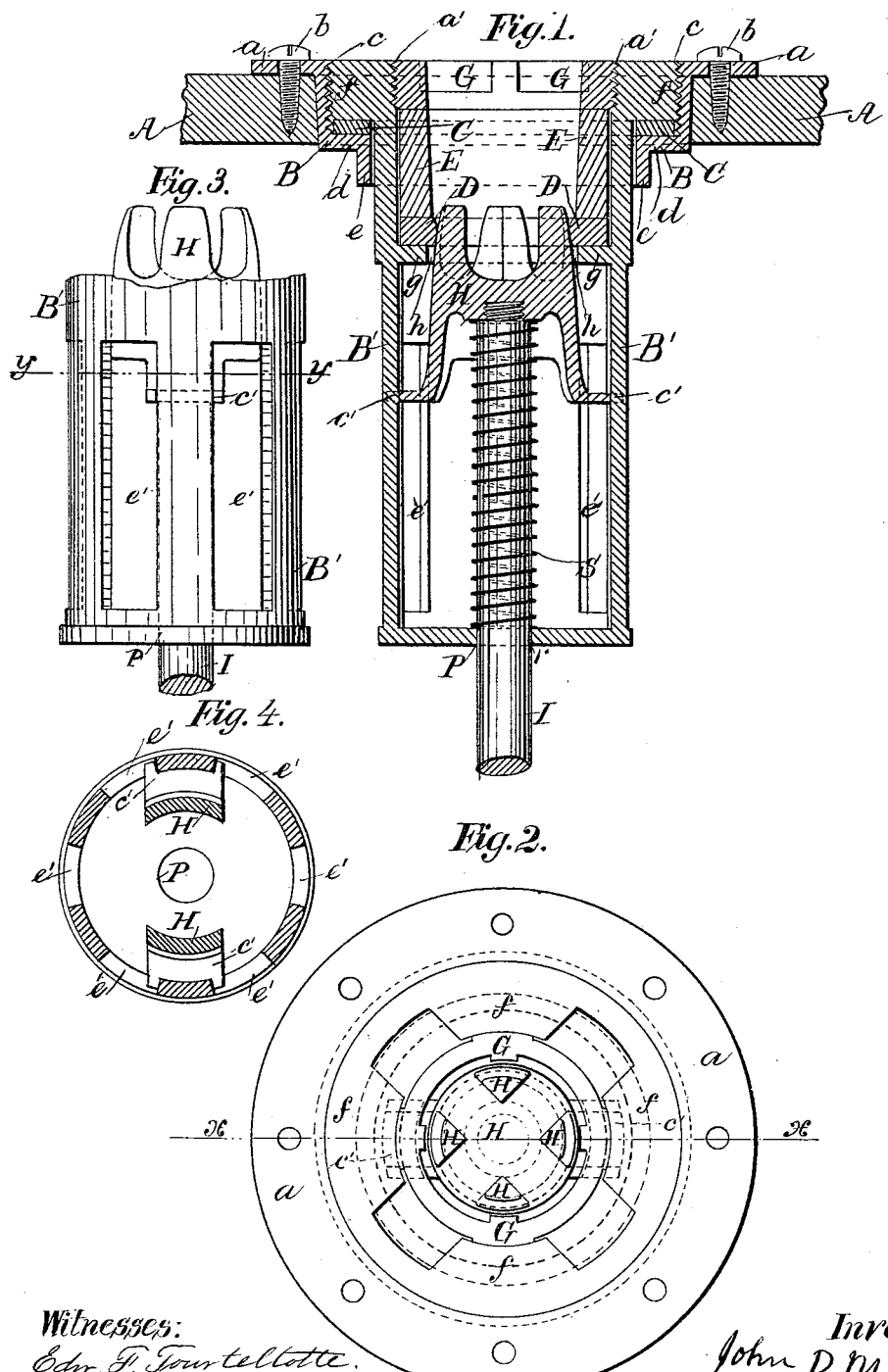
Witnesses:
Edw. F. Tourtellotte.
Chas. A. Herbert.
Inventor
John D Moran
By James A Whitney,
Attorney

UNITED STATES PATENT OFFICE.

JOHN D. MORAN, OF NEW YORK, N. Y.

FAUCET-BUNG.

SPECIFICATION forming part of Letters Patent No. 346,558, dated August 3, 1886.

Application filed March 1, 1886. Serial No. 193,633. (No model.)

*To all whom it may concern:*

Be it known that I, JOHN D. MORAN, of the city, county, and State of New York, have invented certain Improvements in Faucet-Bungs, of which the following is a specification.

The object of this invention is to provide a metallic bung which will automatically yield to the insertion of an ordinary faucet when desired, whereby all the security afforded by a bung under ordinary or normal condition of closure is secured, the ordinary wooden bung wholly dispensed with, and the attachment provided for of a faucet without any of the inconvenience ordinarily incident to the removal of a bung to permit the attachment of the faucet, and whereby on the removal of the faucet the bung is automatically closed, thereby saving time, labor, and possible waste of the contents of the vessel.

My invention comprises certain novel combination of parts whereby any faucet with the common plain taper shank may be employed, thereby obviating the necessity of a specially-constructed faucet, as has heretofore been necessary in this class of devices.

Figure 1 is a central longitudinal sectional view of an apparatus embracing my said invention, and Fig. 2 is a face view of the outer end thereof. Fig. 3 is a side view of a part of said apparatus. Fig. 4 is a cross-section through *y y*, Fig. 3.

A indicates the side of a barrel, cask, or other vessel to which the apparatus may be applied. In this is provided a circular hole or opening to receive the circular flanged socket B, the flange *a* of which rests upon the outer side of the part A, and is secured thereto by bolts, rivets, or screws *b*, or any other suitable means. This socket has an internal screw-thread, *c*, a shoulder, *d*, and a sleeve, *e*, the purposes of which will herein presently appear.

B' is the shell of the apparatus, and has an externally-threaded flange, *f*, at its outer end, a diaphragm, *g*, at a suitable distance from said outer end, and an opening or series of openings, *e'*, at its inner part. Said diaphragm has a central opening, *h*. This shell B is internally threaded at its outer end, as shown at *a'*. The flange *f* is screwed into the internal thread, *c*, of the socket A, with a packing, C, preferably of india-rubber, between the shoulder *d* of the socket and the adjacent and opposing surface of the flange *f*. This packing C serves to make a tight joint, and to prevent leaking between the flange and the socket.

Placed upon the diaphragm *g*, around the opening *h*, is a washer or packing-ring, D, of india-rubber or other suitable material. Upon this is placed a tubular socket-piece, E, the bore of which is intended to be of such size and configuration as to secure the shank of an ordinary faucet. This socket-piece E should preferably be made of some wood which, like white-wood or poplar, will afford no objectionable taste or odor to the contents of the barrel or other vessel. This socket E is kept in place by an annular nut, G, which is screwed into the thread *a'* at the outer end of the shell B.

H is a sliding valve, the outer end of which, when in position to close the apparatus, is thrust outward into or through the opening *h* of the diaphragm, or in such relation with the said opening as to close or stop the same.

With the construction represented in the drawings the valve-seat is formed by the inner edge of the washer or packing-ring D. This valve has radially-extending arms *m*, which have studs *e'* at their extremities, said studs passing outward at the edges of ribs *n*, which are most conveniently located between the openings in the shell B, hereinbefore referred to. This arrangement of parts keeps the valve from turning axially. The valve is furnished with a stem, I, which passes through an opening or guide at *r* at the inner end of the shell B. To keep the valve axially in position a spring, S, is so arranged in relation with the valve and its stem as to press the valve outward to close the opening *h*, as hereinbefore explained.

When desired, the socket-piece E may be of such size, shape, and proportions as to dispense with the packing-ring or washer D, the inner end of the socket-piece being in such case preferably shaped to act in the same manner as the said packing-ring D to form the valve-seat, although, when desired, the valve-seat may be formed directly upon the diaphragm. Under normal conditions, when no faucet is attached, the valve closes the opening $h$, and consequently prevents the outflow of the contents of the barrel or vessel. When a faucet is inserted, its common or tapering shank fits itself to the wood composing the socket-piece E, just as it would to the wood, surface of an ordinary bung-hole, and is thereby held in position in the same manner. This insertion of the shank of the faucet forces inward the valve, thereby permitting the outflow of the liquid from the barrel or vessel to the faucet through the opening $h$. It is of course to be understood that the liquid has at all times ingress to the shell B through the opening or openings therein, hereinbefore referred to.

What I claim as my invention is—

1. The combination of the circular internally-screw-threaded socket B, having the flange $a$, the shell B', having an externally-threaded shoulder, $f$, an internal screw-thread, $a'$, and an annular diaphragm, $g$, the packing C, a valve arranged to move to and from the opening of the diaphragm, the socket-piece E, constructed and arranged to receive the shank of a faucet, and the annular nut G, all substantially as and for the purpose herein set forth.

2. The combination of a circular internally-screw-threaded socket, B, a shell, B', having an externally-screw-threaded shoulder, $f$, an internal thread, $c$, and an annular diaphragm, $g$, a valve arranged to move to and from the opening or surface of the diaphragm, the valve-stem I, guide $r$, spring S, the socket-piece E, constructed to receive the shank of a faucet, and the annular nut G, all substantially as and for the purpose herein set forth.

3. The combination of a circular internally-screw-threaded socket, B, a shell, B', having an externally-screw-threaded shoulder, $f$, an internal thread, $c$, and an annular diaphragm, $g$, packing-ring D, a valve arranged to move to and from the opening or surface of the diaphragm, the valve-stem I, guide $r$, spring S, the socket-piece E, constructed to receive the shank of a faucet, and the annular nut G, all substantially as and for the purpose herein set forth.

JOHN D. MORAN.

Witnesses:
  CHARLES A. HERBERT,
  JOSIAH T. LOVEJOY.